United States Patent [19]

Ohtomo et al.

[11] Patent Number: 4,664,615
[45] Date of Patent: May 12, 1987

[54] METHOD AND DEVICE FOR SHAPING OR MOLDING STICK COSMETICS

[76] Inventors: Seiya Ohtomo, 3-13-32, Oshika, Shizuoka-shi, Shizuoka-ken; Minoru Aoki, 267-10, Yada, Shizuoka-shi, Shizuoka-ken; Yoshio Kasai, 363-31, Kamata, Shizuoka-shi, Shizuoka-ken, all of Japan

[21] Appl. No.: 804,764

[22] Filed: Dec. 5, 1985

Related U.S. Application Data

[62] Division of Ser. No. 575,221, Jan. 30, 1984, Pat. No. 4,587,072.

[51] Int. Cl.$^4$ .............................................. B29C 39/28
[52] U.S. Cl. ..................................... 425/215; 249/81; 249/119; 249/123; 249/124; 249/125; 425/449; 425/803
[58] Field of Search ................. 249/119, 81, 123, 124, 249/125; 425/DIG. 32, 542, 803, 447, 449

[56] References Cited

U.S. PATENT DOCUMENTS

| 29,416 | 7/1860 | Stanley | 249/119 |
| 1,506,539 | 8/1924 | McCoy et al. | 249/119 |
| 1,646,297 | 10/1927 | Lindsay | 264/297.8 |
| 2,652,597 | 9/1953 | Sucher | 264/297.8 |
| 4,147,750 | 4/1979 | Geria et al. | 264/299 |

Primary Examiner—Willard E. Hoag
Attorney, Agent, or Firm—Wegner & Bretschneider

[57] ABSTRACT

Apparatus for molding stick cosmetics, which comprises:
closely fitting a molding block into a vertically extending annular member formed around a container charged with a liquid feed composition for solid cosmetics, said molding block having therethrough a plurality of longitudinal slots which are open at both ends;
filling said liquid feed composition into said longitudinal slots; and, thereafter,
solidifying and drying the thus filled liquid feed composition.

3 Claims, 5 Drawing Figures

METHOD AND DEVICE FOR SHAPING OR MOLDING STICK COSMETICS

This application is a divisional of Ser. No. 575,221 filed Jan. 30, 1984 now U.S. Pat. No. 4,587,072.

FIELD OF THE INVENTION

The present invention relates to a method for shaping or molding stick cosmetics, and is also concerned with a device used to this end.

BACKGROUND OF THE INVENTION

Highly viscous feed compositions for cosmetics in the gelled, pasted or slurried state are generally filled in slots in the stick or rod-like form for shaping or molding. (See, for instance, Japanese Laid-Open Publication Nos. 53-135728—direct casting with a hollow shaft made of wood or synthetic resin, 53-121944—extrusion and filling, and 55-14012—casting and filling with a mold). In this case, nozzles are used to fill the compositions in the slots. As a result, the overall arrangement is complicated, since it is required to apply high pressures due to the entrainment of air or the internal resistance. The prior arrangement is also disadvantageous in that it is impossible to obtain stick cosmetics of good quality.

SUMMARY OF THE INVENTION

A main object of the present invention is to provide a method and device suitable for shaping or molding highly viscous and rapidly solidifying liquid feed compositions for eyebrows, eyeliner, rouge, cheek rouge, eyeshadow, stick foundation, etc. into stick-like cosmetic products. According to one aspect of the present invention, there is provided a method for shaping stick cosmetics, which comprises closely fitting a shaping or molding block into a vertically extending annular member formed around a container charged with a liquid feed composition for solid cosmetics, said shaping or molding block having therethrough a plurality of longitudinal slots which are open at both ends, filling the liquid feed composition into the longitudinal slots, and solidifying and drying the thus filled liquid feed compostion.

According to another aspect of the present invention, there is provided a device for shaping or molding stick cosmetics, which comprises a container to be charged with a liquid feed composition for solid cosmetics, a vertically extending annular member formed around the container, and a shaping or molding block provided therethrough with a plurality of longitudinal slots which are open at both ends, said shaping or molding block being closely fitted into said annular member in a vertically slidable manner.

In accordance with the arrangement of the present invention, it is possible to obtain stick cosmetic products having a reduced amount of air bubbles regardless of the number thereof. The arrangement of the present invention is of so simple structure so that it can be stably used for extended period of time without malfunction.

BRIEF DESCRIPTION OF THE DRAWINGS

The aforesaid and other objects and features of the present invention will become apparent from the following detailed description with reference to the accompanying drawings, in which.

DETAILED DESCRIPTION OF THE INVENTION

Figure 1:
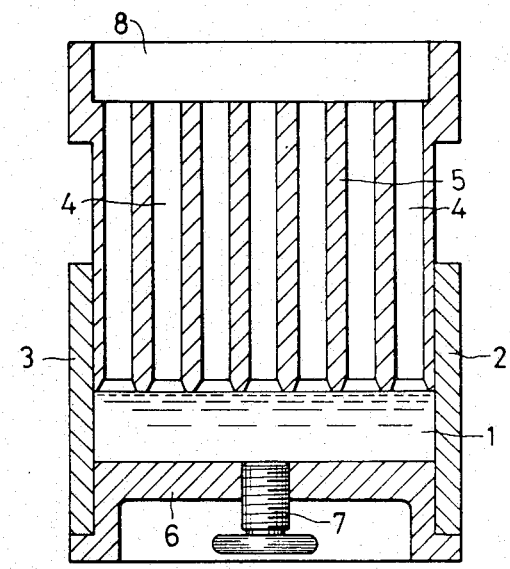
FIG. 1 is a sectional view showing one embodiment of the present invention.
Figure 2:
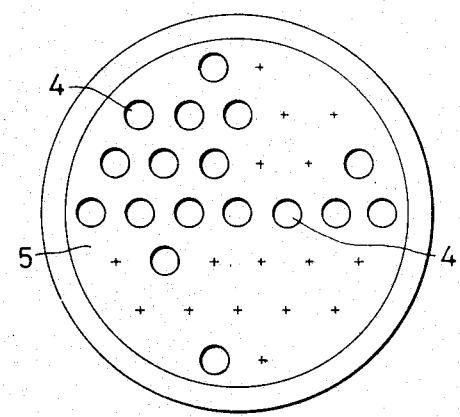
FIG. 2 is a plan view of the same.

Referring to FIGS. 1 and 2, there is shown one preferred embodiment of the present invention, which comprises a container 2 for receiving a highly viscous and rapidly solidifying liquid feed composition for eyebrows, eyeliner, rouge, cheek rouge, eyeshadow, stick foundation or the like, a vertically extending annular member 3 provided around the container 2 and a snaping or molding block 5 closely fitted into the annular member 3 in a vertically slidable manner, said shaping block being provided therethrough with a plurality of longitudinal slots 4 which are open at both ends. A bolt 7 is threaded into a bottom plate 6 of the container 2, and the shaping or molding block 5 is dented in the upper surface. The liquid feed 1 is heated to a given temperature to afford to itself fluidity suitable for shaping or molding, or added with gypsum which is in an unsolidified state.

With the arrangement as mentioned above, the shaping or molding block 5 is inserted into the annular member 3 of the container 2 by suitable means. Thereupon, the liquid feed 1 charged in the container 2 is compressed or compacted, and enters the longitudinal slots 4. An excessive amount of the feed 1 then overflows into the dent 8 formed in the upper surface of the block 5. A volume of the liquid feed 1 to be charged in the container 2 may be larger than the overall volume of the longitudinal slots 4 by 5–30% by volume. After the liquid feed 1 filled within the slots 4 is solidified by water absorption or cooling, the bolt 7 is removed from the bottom plate 6 of the container 2 to take the shaping or molding block 5 out of the annular member 3. Thereafter, stick cosmetic products are pushed out of the longitudinal slots by push rods. It is noted that the longitudinal slots 4 are tapered at an angle of 2-5 degrees, and coated with a releasing agent such as silicone resin to facilitate removal of the solidified stick cosmetics out of the longitudinal slots 4.

Figure 3:
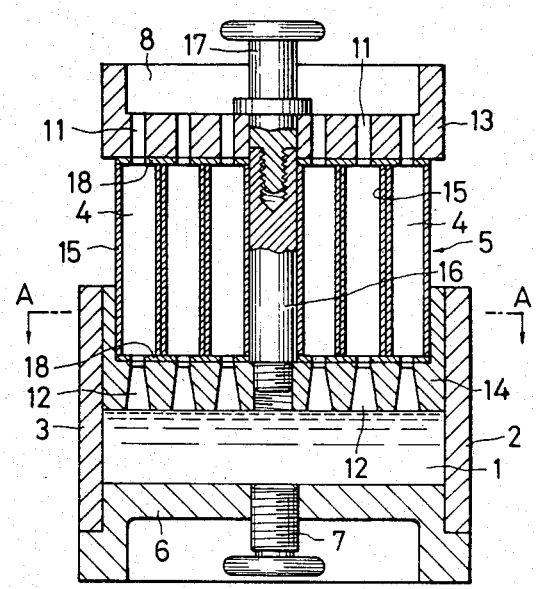
FIG. 3 is a sectional view showing another embodiment of the present invention.
Figure 4:
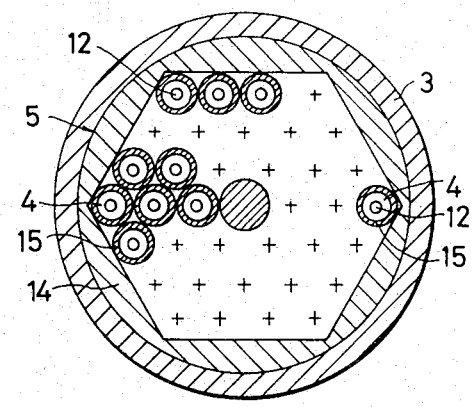
FIG. 4 is a sectional view taken along the line A—A of FIG. 3.

Referring to another embodiment of the present invention illustrated in FIGS. 3 and 4, it comprises a container 2 for receiving a liquid feed composition 1 as mentioned above, a vertically extending annular member 3 provided around the container 2 and a shaping or molding block 5 including upper and lower plates 13 and 14 being provided with a plurality of through-holes 11 and 12, and a plurality of tubular members 15 interposed therebetween which are formed of a metal material or a synthetic resin material capable of being cut, said tubular members having therethrough longitudinal slots 4 in communication with the through-holes 11 and 12. A bolt 16 is threaded into the central portion of the lower plate 14, and a set screw 17 is inserted through the central portion of the upper plate 13, and threaded onto the uppermost portion of the bolt 16 to lock the upper plate 13 in place. Reference numeral 18 is a packing, 6 is a bottom plate of the container 2, and 7 is a bolt threaded into the bottom plate 6.

The shaping or molding block 5 is inserted into the annular member 3 of the container 2. Thereupon, the liquid feed composition 1 charged in the container 2 is compressed and compacted and enters the longitudinal slots 4 through the through-holes 12 in lower plate 14. An excessive amount of the liquid feed 1 then overflows into the dent 8 formed in the upper surface of the upper plate 13 through the through-holes 11 therein. A volume of the liquid feed composition 1 to be charged in the container 2 is the same as mentioned in the first embodiment.

After the liquid feed composition 1 filled within the longitudinal slots 4 in the tubular member 15 of the shaping or molding block 5 is solidified by cooling or water absorption, the bolt 7 is threaded out of the bottom plate 6 of the container 2. Subsequently, the shaping or molding block 5 is removed out of the annular member 3 of the container 2. The set screw 17 and the upper plate 13 are then removed to take the tubular members 15 from within. Finally, the solidified stick cosmetic products are pushed out of the tubular members 15 by push rods. Alternatively, when the tubular members 15 are formed of a synthetic resin material capable of being cut, the solidified cosmetics may be used as an applicator.

Figure 5:
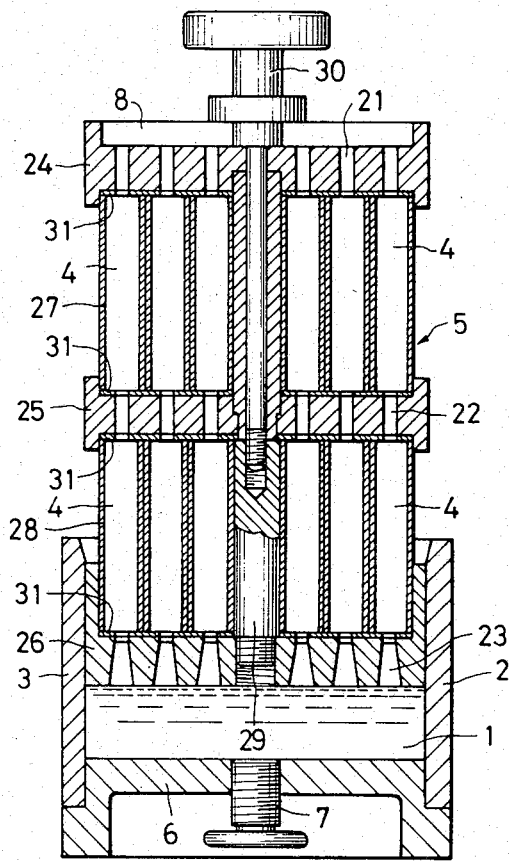
FIG. 5 is a sectional view showing a further embodiment of the present invention.

Referring to a further embodiment of the present invention illustrated in FIG. 5, it comprises a container 2 for receiving a liquid feed composition 1 as mentioned above, a vertically extending annular member 3 provided around the container 2 and a shaping or molding block 5 inserted into the annular member 3 in a vertically slidable manner with the lower portion coming into close contact therewith. In this embodiment, the shaping or molding block 5 includes upper, middle and lower plates 24, 25 and 26 being respectively provided with a plurality of through-holes 21, 22 and 23, and a plurality of tubular members 27 and 28 interposed between the plates 24 and 25 and between the plates 24 and 25, said tubular members having therethrough longitudinal slots 4 in communication with said through-holes 21, 22 and 23 and being formed of a metal material or a synthetic resin material capable of being cut. A bolt 29 is threaded into the central portion of the lower plate 26. A set screw 30 is threaded onto the uppermost portion of the bolt 29, and extends through the central portions of the upper and middle plates 24 and 25 to lock them in place. Reference numeral 31 is a packing, 6 is a bottom plate of the container 2, and 2 is a bolt threaded into the bottom plate 6.

The shaping or molding block 5 is inserted into the annular member 3 of the container 2 by suitable means. Thereupon, the liquid feed composition 1 charged in the container 2 is compressed or compacted, and enters the lower longitudinal slots 4 through the through-holes 13 in the plate 26. Then, the liquid feed composition 1 enters the upper longitudinal slots 4 through the through-holes 22 formed in the middle plate 25, and an excessive amount of the feed 1 overflows in the dent 8 formed in the upper surface of the upper plate 24. A volume of the liquid feed to be charged in the container 2 is the same as mentioned in the first embodiment.

After the liquid feed composition 1 filled in the longitudinal slots 4 in the shaping or molding block 5 is solidified by cooling or water absorption, the bolt 7 is pulled out of the bottom plate 6 of the container 2 to remove the shaping or molding block 5 from within the annular member 3. The set screw 30 is removed with the upper plate 24, and the upper tubular member 27 is removed, followed by removal of the middle plate 25 and the lower tubular member 28. Finally, the solidified cosmetics are pushed out of the tubular member by means of push rods. Alternatively, when the tubular members are formed of a synthetic resin material capable of being cut, the solidified cosmetics may be used as an applicator.

What is claimed is:

1. A device for molding stick cosmetics, comprising:
a container to be charged with a liquid feed composition for solid cosmetics having a base and a vertically extending annular member;
a molding block having a plurality of longitudinal slots which are open at both ends and a recess at the top end for collecting excess liquid feed composition, said molding block being closely fitted into said annular member in a vertically slidable manner.

2. A device as claimed in claim 1, wherein said molding block comprises a plurality of plates having a plurality of through-holes therethrough, and a plurality of tubular members interposed therebetween, each of said tubular members forming therethrough one of said plurality of longitudinal slots, said plates being capable of engaging said tubular members when the liquid feed composition is forced into the longitudinal slots, and being capable of disengaging said tubular members when the composition is to be removed.

3. A device as claimed in claim 2, wherein said plurality of plates are vertically spaced apart and are transversely disposed with respect to said container, and while engaged with said tubular members, each of the plurality of through-holes communicates with one of the longitudinal slots.

* * * * *